United States Patent [19]

Lieberman

[11] 4,310,351

[45] Jan. 12, 1982

[54] METHOD FOR RECOVERING LEAD FROM BATTERIES

[76] Inventor: Benjamin Lieberman, 901 Valley Rd., Charleston, W. Va. 25302

[21] Appl. No.: 157,224

[22] Filed: Jun. 9, 1980

[51] Int. Cl.³ .............................................. C22B 13/00
[52] U.S. Cl. ......................................... 75/77; 75/63
[58] Field of Search ............................. 75/77, 78, 63

[56] References Cited

U.S. PATENT DOCUMENTS 2,966,350 12/1960 Neumann ................................. 75/77
3,679,395 7/1972 Smyers et al. ........................... 75/78
3,940,265 2/1976 Wilson ..................................... 75/77

Primary Examiner—M. J. Andrews

[57] ABSTRACT

A method has been developed whereby scrap lead storage batteries are mechanically treated and screened. Upon subsequent heating of the oversized fraction, 25-30% of the dry weight is recovered as metal. Using this method as a pretreatment to the reduction of the lead oxides and lead sulfate, a significant cost reduction can be made to the overall process. As a process of its own, metallic lead can be obtained and sold and the residual lead compounds can be sold to a smelter as a higher quality feed.

3 Claims, No Drawings

METHOD FOR RECOVERING LEAD FROM BATTERIES

The present invention relates to improvements in the recovery of lead from lead storage batteries prior to smelting whereby 25-30% of the active dry battery material weight is recovered as metal. Since, in general, a storage battery is about 45% metallic lead, a simple and inexpensive method of recovering an appreciable percentage of this metal obviates the need for expensive pyrometallurgical processes. In addition, this method does not result in metallic dust loss as in the pyrometallurgical procedures.

Generally, scrap dealers accumulate storage batteries, drain off their acid content, strip off and discard the cases, and ship the active material to smelters for reduction to metallic lead.

These dealers and other have observed the metallic lead present in the battery cells and have heated these cells expecting to recover the available lead. The recovery has been very poor and uneconomical. This resulted from the failure to appreciate that the lead dioxide present in the positive plates is a powerful oxidizer. In the course of heating and in proportion to the degree of agitation and temperature, metallic lead is converted to lead oxide according to:

$$4PbO_2 + 2Pb = Pb_3O_4 \; (300°\text{-}450° \text{ C.})$$

$$Pb_3O_4 + 2Pb = 8PbO \; (500° \text{ C.})$$

In my invention the atmospheric or forced air dried battery cells are loaded into a tumbler and rotated at slow speed, 20-40 R.P.M., for 30-60 minutes so that the plates fall a limited distance and strike each other. The cell plates break into large pieces and, in particular, the lead dioxide is disengaged from the positive grids.

The tumbled material is passed over a vibratory screener fitted with a screen containing ⅜ inch or ¼ inch square openings. The oversize fraction will be 40-50% of the charge. This fraction is placed in a crucible and heated to 350°-375° C. whereby molten lead drains and collects in the bottom of the crucible. This is antimonial lead. This is drawn off and cast into ingots. These ingots are analyzed for percent antimony and sold to battery manufacturers or other lead consumers. The lead oxides, lead sulfate, and other impurities float to the top. During the crucible heating, agitation is held to a minimum as is the temperature in order to minimize the mixing of lead dioxide with the molten lead and consequent oxidation of the lead.

The floating layer in the crucible is removed and added to the undersize fraction. The combination is smelted or sold to a smelter.

What is claimed is:

1. A method of obtaining crude metallic lead from scrap storage batteries comprising:
    providing relatively dry storage battery grids including positive grids comprised of metallic lead and lead dioxide;
    tumbling said grids at a slow speed thereby breaking said grids into large pieces and disengaging said lead dioxide;
    separating said disengaged lead dioxide using a screen through which said lead dioxide passes while retaining an oversized fraction relatively free of lead dioxide; and
    melting said oversized fraction in a crucible at a temperature of between 350° C. to 375° C. thereby obtaining crude metallic lead, said method thereby resulting in higher yields because the decreased presence of lead dioxide minimizes the oxidation of the obtained crude metallic lead during smelting.

2. A method according to claim 1 wherein said screen has ½ inch square or smaller openings.

3. A method according to claim 1 whereby during melting agitation is held to a minimum to minimize mixing of any lead dioxide with the molten lead and consequent oxidation of the lead.

* * * * *